United States Patent
Kübler et al.

(10) Patent No.: US 10,730,781 B2
(45) Date of Patent: Aug. 4, 2020

(54) METHOD FOR LOCALLY DEFORMING A FLAT SURFACE OF A SUBSTRATE MADE OF GLASS OR A GLASS CERAMIC, AND AN OPERATING ELEMENT PRODUCED WITH SAID METHOD

(71) Applicant: Fraunhofer-Gesellschaft zur Foerderung der angewandten Forschung e.V., Munich (DE)

(72) Inventors: Rainer Kübler, Freiburg (DE); Peter Gumbsch, Gundelfingen (DE); Tobias Rist, Gundelfingen (DE); Matthias Gremmelspacher, Freiburg (DE); Britta Lang, Schallstadt (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 0 days.

(21) Appl. No.: 16/097,553

(22) PCT Filed: Apr. 27, 2017

(86) PCT No.: PCT/EP2017/060073
§ 371 (c)(1),
(2) Date: Oct. 29, 2018

(87) PCT Pub. No.: WO2017/186857
PCT Pub. Date: Nov. 2, 2017

(65) Prior Publication Data
US 2019/0152828 A1    May 23, 2019

(30) Foreign Application Priority Data
Apr. 28, 2016   (DE) .................. 10 2016 207 233

(51) Int. Cl.
*C03B 23/02*     (2006.01)
*C03C 23/00*     (2006.01)
(Continued)

(52) U.S. Cl.
CPC .............. *C03B 23/02* (2013.01); *B60K 37/06* (2013.01); *C03C 19/00* (2013.01); *C03C 23/007* (2013.01);
(Continued)

(58) Field of Classification Search
CPC ..... B60K 37/06; C03B 23/0013; C03B 23/02; C03C 19/00; C03C 23/001;
(Continued)

(56) References Cited

U.S. PATENT DOCUMENTS

| | | |
|---|---|---|
| 5,412,189 A | 5/1995 | Cragun |
| 6,118,103 A | 9/2000 | Vilato et al. |

(Continued)

FOREIGN PATENT DOCUMENTS

| | | |
|---|---|---|
| DE | 865643 C | 2/1953 |
| DE | 1075805 B | 2/1960 |

(Continued)

OTHER PUBLICATIONS

International Search Report for PCT/EP2017/060073, dated Jun. 27, 2017; English translation submitted herewith (7 pgs.).

*Primary Examiner* — Nelson M Rosario
(74) *Attorney, Agent, or Firm* — Fitch, Even, Tabin & Flannery LLP

(57) ABSTRACT

The invention locally deforms a flat surface of a substrate made of glass or a glass ceramic by applying heat exclusively within a locally limited region via the flat surface by laser radiation, a gas flame, infrared radiation, microwaves or a plasma discharge directed towards the flat surface of the substrate to soften the substrate at least on the flat surface (Continued)

within the locally limited region; applies a force acting on the softened flat surface within the locally limited region which deforms the softened surface of the substrate within the locally limited region; cools the substrate to obtain a set deformed surface within the locally limited region; and applies heat exclusively within the locally limited region via the flat surface of the substrate to produce a temperature and viscosity gradient inside the substrate laterally and orthogonal to the flat surface within the locally limited region.

15 Claims, 1 Drawing Sheet

(51) Int. Cl.
*C03C 19/00* (2006.01)
*B60K 37/06* (2006.01)
*G06F 3/0488* (2013.01)
*G06F 3/0338* (2013.01)
*G06F 3/0362* (2013.01)
*G06F 3/041* (2006.01)
*C03B 23/00* (2006.01)

(52) U.S. Cl.
CPC ........ *C03C 23/0025* (2013.01); *G06F 3/0338* (2013.01); *G06F 3/0362* (2013.01); *G06F 3/041* (2013.01); *G06F 3/0488* (2013.01); *C03B 23/0013* (2013.01); *G06F 2203/04103* (2013.01); *G06F 2203/04809* (2013.01)

(58) Field of Classification Search
CPC .............. C03C 23/0025; C03C 23/006; C03C 23/0065; C03C 23/007; G06F 3/0338; G06F 3/0362; G06F 3/041; G06F 3/0488; G06F 2203/04103; G06F 2203/04809
See application file for complete search history.

(56) References Cited

U.S. PATENT DOCUMENTS

| | | |
|---|---|---|
| 2008/0016916 A1 | 1/2008 | Yang |
| 2013/0086948 A1* | 4/2013 | Bisson ................ C03B 23/0258 65/106 |
| 2013/0321903 A1* | 12/2013 | Grzybowski ....... C03C 23/0025 359/350 |
| 2015/0274015 A1 | 10/2015 | Wachinger et al. |
| 2016/0031737 A1* | 2/2016 | Hoppe ................ C03B 23/0256 428/187 |

FOREIGN PATENT DOCUMENTS

| | | |
|---|---|---|
| DE | 69929867 T2 | 9/2006 |
| DE | 102008048907 A1 | 4/2010 |
| DE | 102012020609 A1 | 4/2014 |
| DE | 202014006401 U1 | 9/2014 |
| DE | 102014110920 A1 | 2/2016 |

* cited by examiner

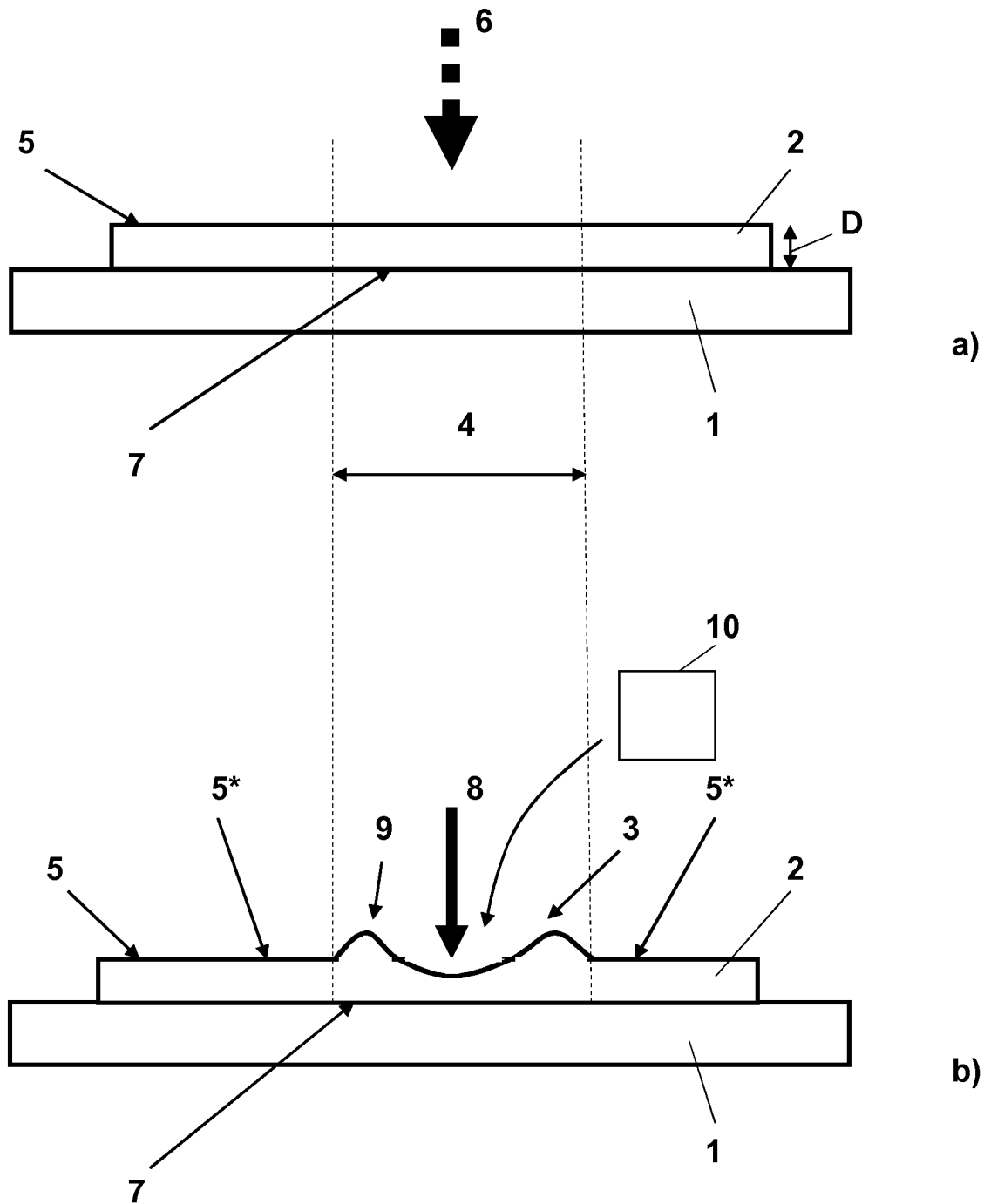

METHOD FOR LOCALLY DEFORMING A FLAT SURFACE OF A SUBSTRATE MADE OF GLASS OR A GLASS CERAMIC, AND AN OPERATING ELEMENT PRODUCED WITH SAID METHOD

CROSS REFERENCE TO RELATED APPLICATIONS

Reference is made to PCT/EP2017/060073 filed Apr. 27, 2017, and German Application No. 10 2016 207 233.1 filed Apr. 28, 2016, which are incorporated herein by reference in their entirety.

BACKGROUND OF THE INVENTION

Field of the Invention

The invention relates to a method for locally deforming a flat surface of a substrate made of glass or glass ceramic and furthermore to an operating element which is produced by the method.

Description of the Prior Art

In a plurality of different applications and configurations of manual operating elements for interaction with technical systems and devices, there is the desire to reduce the number of operating elements for design and cost reasons and at the same time increase the degree of functionality of inputs usually configured in the form of buttons or switches. Furthermore, when dealing with operating elements of this type in practice, a user impression which is as valuable as possible should be produced which should correspond to the haptic impression obtained when contacting high-quality glass or glass ceramic surfaces. Furthermore, high requirements are imposed on the surface quality of the operating elements with regard to a high surface quality, easy cleaning and corrosion and scratch resistance as well as durability and ageing resistance. All these demands can fundamentally be met by glass or glass ceramic materials.

Known examples for devices with high-quality user interfaces with integrated or adapted operating elements, the manual touching or actuation of which triggers technical functions, are touch-sensitive graphic interfaces of smartphones and tablet PCs. An input of manual control or activation signals is usually accomplished on the otherwise smoothly configured user interface by tapping and swiping gestures. The input field additionally depicted in a visually perceptible manner on the graphic interface imparts the additionally required information relating to the exact input location to execute the touch. Consequently a direct visual contact to the operating area is required for precise and direction operation of individual graphically underlaid regions on the user interface. This process in which a user must first visually identify the operating area and then trigger the interaction by touching an appropriate area is extremely unfavorable for a plurality of applications. In particular, in the case of activities which require a high degree of attentiveness to the surroundings, a glance at the operating area constitutes an unacceptable diversion from the actual event. In this connection, reference is made to the increasingly widespread use of touch-sensitive, graphic-supported operating areas as manual input or operating consoles in vehicles by means of which most diverse operating elements can be very efficiently and cost-effectively arranged and activated clearly and in a space-saving manner.

Since however, as already mentioned, visual contact towards the user interface is required for an unambiguous operation of the operating means, in particular in motor vehicle construction, haptically perceptible buttons and switches are nevertheless retained which are in particular responsible for the actuation of very important and very frequently used driving functions. Haptically grippable and perceptible operating elements of this type enable the user to have an unambiguous haptic acknowledgement and enable a diversion-free operation of all the functions associated with these conventional operating elements.

In connection with operating elements configured to be raised above a user interface, reference is made to the following documents for the prior art:

The document DE 10 2011 115 379 A1 discloses a coated glass or glass ceramic substrate having a layer with haptic properties, wherein the layer has a haptically perceptible structure and preferably consists of plastic material.

US published patent application 2012/0146922 A1 describes a touch-sensitive user interface which provides haptically perceptible panel elements applied in a structured manner to a glass substrate, which are configured and arranged in a type of chessboard arrangement and thus enable the user to have a haptically perceptible surface spatial resolution. In this case also, the haptically perceptible structure panels are also coated with a plastic layer.

All haptically perceptible surface structures based on plastic material however inherently have the problem of the adhesion of particles which are observed as impurities, ageing, lack of scratch resistance as well as corrosion due to cleaning agents and media such as oils and fats which can be transferred by the user to the plastic surface during use.

In order to avoid the preceding problems, it is possible to imprint the corresponding structures directly into the glass surface to avoid hybrid material structures. For this purpose a method and an apparatus for hot forming of precision structures in flat glass are explained from the document DE 197 13 309 C1 in which a heated forming tool having a structuring surface is pressed into the glass material on one side of the flat glass, wherein the heating and softening of the glass material for the deformation is accomplished via a specific heating of the forming tool itself. The exclusive heating via the tool can have the result that stresses or complete cracks can form at the beginning of the forming process in the not yet sufficiently heated glass. In addition, there is the risk of adhesion or also sticking of softened glass on the tool, especially as contact with the tool must last until the glass is heated to the required forming temperature. As a result, too high interface temperatures are achieved in some circumstances.

The document DE 10 2010 020 439 A1 describes a thermal forming method for flat glass substrates in which, for example, a glass pane to be deformed is heated entirely inside a furnace whilst it rests on a moulding tool. Upon reaching the softening temperatures, the glass pane adopts the surface shape of the tool by way of the gravitational force acting thereon, possibly assisted by additional positive or negative pressure forces, since the glass pane nestles flat against the surface contour of the tool.

Furthermore, deduced from each of the documents DE 10 2010 045 094 B2 and DE 103 444 A1 is a forming method for the surface structuring of glass products in which for the purpose of the forming, a forming roller or roll tool is placed under the action of force on the respectively heated and softened glass product surface. However, the use of these types of roll or roller tools has the disadvantage that flat areas of the glass surfaces not to be structured are necessarily, albeit only slightly, co-formed and thus lose their original surface quality from the float glass process. The tool contact with the glass surfaces not to be deformed, which is not required in large parts, also inevitably results in wear and furthermore causes a further process technology expenditure.

The document DE 10 2012 020 609 A2 explains an operating element for an automobile in which the haptically perceptible operating element sticks up above a glass surface and is formed by means of deep drawing of the user interface in the heated state.

The document DE 10 2014 110 923 A1 discloses a method for producing a formed glass or glass ceramic article, for example a glass ceramic cooking surface, in which a disk-shaped initial glass is heated and then formed by application of a force.

US published patent application 2016/0031737 A1 discloses a method for forming a glass article without using a forming tool. The heated glass substrate is deformed in this case by use of vacuum pressure differences.

Both preceding documents describe forming processes in which it is not desirable for the entire heated area to be subjected to an application of force for the purposes of deforming.

The document DE 691 14 680 T2 discloses a method for producing a spout of a glass container in which the surface to be deformed is softened by means of a burner and then formed outwards by means of a forming roller.

US published patent application 2011/0039071 A1 discloses a method for producing elevated structures on a transparent substrate in which laser radiation initially brings about an increase in the absorption coefficient inside a glass and a further irradiation results in an expansion of the glass material as a result of the energy input.

SUMMARY OF THE INVENTION

The invention is a method for locally deforming a flat surface of a substrate made of glass or a glass ceramic in such a manner that on the one hand it should be ensured that in the regions in which no deformation takes place, the glass surface does not experience any loss of quality originating from the deforming process. On the other hand, haptically perceptible structures should be introduced into the substrate surface which should meet all the requirements for a manually operable high-quality user surface, which in particular should have a high surface quality, easy cleaning, corrosion and scratch resistance, durability, ageing resistance etc. From economical viewpoints, the method should also be suitable for mass production on an industrial scale.

The method according to the invention for locally deforming a flat surface of a substrate made of glass or a glass ceramic is characterized by the combination of the following process steps: In a first step heat is applied exclusively within a locally limited region via the surface of the substrate, wherein the locally limited region at least in some regions seamlessly adjoins a surface region of the substrate to which heat is not applied or is completely surrounded by this. The heat is applied in such a manner so that the substrate softens within the locally limited region at least on the surface, that is adopts a plastically deformable state. The heat is applied by laser radiation, gas flame, infrared radiation, electrical microwaves or plasma discharge directed towards the surface of the substrate.

In a following process step, a force is applied to the softened surface within the locally limited region by which the softened surface of the substrate is deformed within the region. After reaching the desired deformation which is in particular used to obtain a haptically perceptible surface structure, the substrate is cooled to obtain a surface that is deformed and set within the local region.

Alternatively or in combination with the previously explained process steps according to the invention, instead of or in combination with the application of a force directed to the softened surface within the locally limited region, a force, which is directed to a substrate surface opposite the softened surface, can also act so that the softened surface of the substrate opposite the substrate surface is deformed within the locally limited region.

The last process alternative is particularly suitable in that case in which the heat is applied via the surface of the substrate in such a manner that a temperature gradient is established within the locally limited region between the softened surface and the substrate surface opposite this so that the substrate on the substrate surface opposite the softened surface is elastically, preferably plastically deformable at least in some regions. In this way, a force directed to the "rear-side" substrate surface is able to deform this locally with the result that a surface deformation is apparent on the opposite softened surface. It is also feasible that the desired surface deformation on the side of the softened surface is obtained as a result of a superposed action of force both from the side of the softened surface and also from the side of the substrate surface opposite this surface. As a result of the only limited application of heat through the smooth and preferably untreated surface of the glass or glass ceramic substrate exclusively within the at least one limited region in which the desired surface deformation should take place, the remaining surface of the substrate adjacent to this at least one region remains unaffected both with regard to a direct application of heat and also in relation to a possible contacting with a forming tool and thus retains its original highest surface quality from the float glass process unchanged.

However, the application of heat directed towards the surface of the substrate within the limited region is preferably accomplished in a manner in which the surface quality undergoes no surface degradation or only negligibly small surface degradation caused by the application of heat. This is achieved by a contact-free application of heat, for example, using directional laser radiation, aperture-limited infrared radiation or by microwaves or by a local plasma discharge over or a gas flame directed to the locally limited region on the surface.

The application of heat directed exclusively within the locally limited region via the surface of the substrate is preferably metered in such a manner that a temperature and viscosity gradient is formed laterally and orthogonally to the substrate surface. The temperature gradient oriented laterally, that is longitudinally to the surface should result in a lateral viscosity gradient in which the surface regions which seamlessly adjoin the locally limited surface region to which heat is applied undergo no softening whereas the surface to which heat is applied should be softened. Depending on the actually selected substrate material which can preferably be glass or a glass ceramic, for example, soda lime glass, borosilicate glass, aluminosilicate glass, quartz glass, chalcogenide glass or mixtures of the aforesaid glasses with metals or ceramics, the application of heat is ended as soon as the substrate on the surface within the locally limited region acquires a viscosity between $10^5$ and $10^{11}$ Pa·s, in particular between $10^8$ and $10^9$ Pa·s. The preceding substrate materials as a result of their thermal heat-conducting properties, hardness and smooth surface condition impart to the end product a haptically perceptible high-quality surface quality.

Also depending on the shape and size of the substrate and in particular on the substrate thickness, a temperature and viscosity gradient oriented orthogonally to the surface of the substrate is established which determines the thermally induced softening of the substrate material in depth or thickness extension within the substrate. The viscosity gradient along the thickness of the substrate should preferably be configured so that the substrate surface opposite the surface of the substrate to which heat is applied has a viscosity above those viscosity values at which the substrate material begins to soften. Advantageously the substrate also rests on a heat-removing underlayer so that the substrate surface lying directly on the underlayer can be cooled.

In a further preferred variant of the method according to the invention, it is possible, in particular for the purpose of avoiding thermally induced mechanical metal stresses and material cracks possibly caused thereby, to pre-heat the substrate in its entirety prior to the local application of heat, wherein the substrate is pre-heated to a temperature below the softening temperature of the substrate. The pre-heating can preferably be performed within a thermal furnace suitable for this.

For the purpose of deforming the surface within the locally limited region in which the substrate surface has acquired a softened state by way of the local application of heat, a local application of force is made to the softened surface within the locally limited region either in its entirety, in some regions, locally or locally distributed depending on the form in which the desired surface deformation should be made. The force can be applied in different ways.

A first possibility for applying the force uses a suitably configured tool which is brought into punctuate or extensive contact with the softened surface of the substrate. In this way, pressing forces oriented orthogonally to the surface and/or shear forces oriented obliquely to the surface can be applied, by means of which the softened substrate material is displaced, which result in displacements of the softened substrate material directed laterally to the surface, which are ultimately characterized by material deformations appearing on the surface of the softened substrate. Not necessarily but in advantageous form it is possible to pre-heat the tool coming in contact with the surface for the purpose of local surface deformation.

Alternatively or in combination with the use of one or more of the previously explained tools for the purpose of local surface deformation, it is suitable to apply a positive or negative pressure prevailing locally above the softened surface, which acts continuously or in a pulsed manner at least on the locally limited softened surface of the substrate for the purpose of a surface deformation. In order to provide or achieve a local pressure gradient prevailing on the softened surface of the substrate, pressure nozzles are used by means of which a gas flow, spatially directed, for example in the form of compressed air, can be directed onto the surface in order to produce a positive pressure. Equally it is conceivable to position a suction nozzle arrangement close to the surface, as a result of the suction effect of which a near-surface negative pressure can be formed at least temporarily.

A further variant for the application of the force acting on the surface within the locally limited region adheres at least one body to the softened surface in such a manner that the body forms a permanent and/or firmly bonded connection to the softened substrate. Preferably the body is the same materials as the substrate and at least when coming in contact with the softened surface likewise experiences a softening, which results ultimately in a firmly bonded connection being established. It is also possible to select the material for the at least one body in such a manner so that a permanent non-positive connection is formed. This is particularly useful for the case when the softening temperature of the body to be applied lies above the softening temperature of the substrate material.

In principle, it is possible to apply the force acting on the surface within the locally limited region temporally during and/or after the application of heat. In the same way it is possible to end the application of force to the surface within the locally limited region before, during or after the cooling of the surface.

As a result of the heating of the substrate surface exclusively on at least one locally limited region of the surface, energy savings and also significant shortening of the required process times can be expected, especially in particular with a view to an industrial application of the method according to the invention since the necessary heating and cooling processes have an appreciable influence on process costs and also process times. It should be noted that it is possible with the method according to the invention to make the deformations according to the invention on a single substrate surface on a plurality of respectively locally limited regions. These can be made on a substrate surface either parallel in time or consecutively in time, depending on available resources.

Since, as already mentioned, all surface regions of the substrate not involved in the deforming process do not experience any application of heat directed directly onto these, the surface quality of precisely these surface regions remains uninfluenced. Furthermore, by way of the targeted and local application of force to the softened substrate surface, heated substrate material is predominantly displaced laterally to the application of force. In this way, the substrate surface opposite the application of heat remains preserved and largely uninfluenced. Stresses inside the substrate near the edge can thus be better controlled especially as the edge region is not heated and therefore no mechanical stresses can be introduced into the edge region during the deforming process.

With the method according to the invention, preferably at least one operating element can be produced for manual actuation which extends above or below a user interface and has a haptically perceptible structure size and structure shape, wherein at least the user interface is a glass or glass ceramic substrate. In a preferred embodiment, the operating element is formed in one piece from the glass or glass ceramic material and thus forms an elevated or lowered haptically perceptible shape integrally above or below the user interface, for example in the form of a concave or convex structure which has a structure size between 100 µm and a few centimeters.

The operating element is preferably part of a pressure- or touch-sensitive graphical surface such as can be used for the operation of electrical devices in general and in particular as an operating panel for household devices, devices for the entertainment industry as well as for the vehicle area to mention a few. Particularly feasible is the use and configuration of the operating elements as wall function switches in buildings for actuating technical units, for example of lamps, heating, air-conditioning or alarm installations. The operating elements according to the invention can preferably be implemented depending on the configuration of shape and size as haptically perceptible positioning aids, pressure switches, push switches, slide switches or rotary knobs.

In this case, the substrate surface, which corresponds to the user interface, is arranged on the at least one technically functional operating element, preferably configured to be flat but it is possible to configure the user interface overall as curved or domed.

In addition to a haptically perceptible structure formation on the substrate surface, the method according to the invention can also be used for the structure formation of at least one of exclusively visually perceptible and optically functional structures on the substrate surface. Surface structures can also be created by way of the explained method which are inaccessible to the haptic sense of touch as a result of the small structure size but form refraction- and diffraction-initiating structures for light waves. In this way, for example, it is also possible to achieve optical grids.

BRIEF DESCRIPTION OF THE DRAWINGS

The invention will be described as an example hereinafter without restricting the general inventive idea by means of an exemplary embodiment with reference to the drawings. In the figures:

FIGS. 1a and b show sequence diagrams illustrating the method according to the solution by means of a glass pane to be deformed.

DETAILED DESCRIPTION OF THE INVENTION

FIG. 1a shows a schematic diagram of an underlayer 1 on which a substrate in the form of a glass pane 2 which lies flat on the underlayer 1. For the purposes of a local deformation 3, see FIG. 1b, within a locally limited region 4 on the upper side 5 of the glass pane 2, the glass pane 2 is heated in the region 4 to be deformed locally by an application of heat 6, for example with a laser beam, an infrared emitter, a gas flame etc. The heating of the glass substrate 2 within the locally limited region 4 takes place until the surface 5 within the locally limited region 4 softens and acquires a viscosity, preferably between $10^8$ and $10^9$ Pa·s. In this case, a temperature and also viscosity gradient is established over the thickness D of the glass pane 2 so that the opposite rear-side substrate surface 7 which corresponds to the rear side of the glass pane 2, largely retains its elastic properties. An advantageous cooling of the rear-side glass pane surface 7 which can take place via the underlayer 1 ensures that the glass does not soften on the rear-side substrate surface 7.

The application of heat 6 is ended as soon as the locally limited region 4 on the surface 5 of the glass pane 2 is completely or largely completely softened. The remaining surface regions 5* of the glass pane 2 which seamlessly and integrally adjoin the locally limited region 4 remain below the softening temperature and are therefore not softened.

Closely integrated in time with respect to the heating of the surface 5 within the locally limited region 4, the softened surface undergoes deforming within the locally limited region 4 by an application of force 8, preferably provided from a tool while the glass pane 2 lies on the underlayer 1. By means of a central application of force 8 directed onto the surface within the locally limited region 4, the glass material is displaced downwards, with the result that it results in a lateral displacement of material within the glass pane 2, resulting in an elevation 9 radially around the location of the force application 8.

Various types of haptically perceptible surface structures can be characterized by the shape and size of the locally limited region 4 of the heated surface and the type of force application 8. Depending on the requirement and haptic effect of the resulting surface deformation 3, a corresponding structure size is impressed into the glass pane, which can comprise local elevations, preferably in the mm range and lateral extensions as far as into the cm range.

Alternatively or in combination with the application of a force 8, preferably a glass body 10 can be placed on the softened surface region of the glass substrate 2 to form a haptic structure. By way of the local heating the glass body 10 also undergoes a local softening, with the result that a firmly bonded connection is formed between the glass body 10 and the glass substrate 2.

In addition, it is possible to form the glass pane 2 before or after the surface deformation in its entirety, and for example by bending. For this purpose the glass pane 2 is heated in its entirety, for example in a process furnace.

REFERENCE LIST

1 Underlayer
2 Glass pane
3 Deforming, operating element
4 Locally limited region
5 Surface of glass pane
5* Locally adjoining surface regions of the glass pane
6 Application of heat
7 Rear-side glass pane surface
8 Application of force
9 Elevation
10 Glass body

The invention claimed is:

1. A method for locally deforming a flat surface of a substrate made of glass or a glass ceramic, comprising:
   applying heat exclusively within a locally limited region via the flat surface of the substrate by one of laser radiation, a gas flame, infrared radiation, microwaves or a plasma discharge directed towards the flat surface of the substrate to soften the substrate at least on the flat surface within the locally limited region;
   applying a force acting on the softened flat surface within the locally limited region to deform the softened surface of the substrate within the locally limited region;
   cooling the substrate to obtain a set deformed surface within the locally limited region; and
   applying heat exclusively within the locally limited region via the flat surface of the substrate to produce a temperature and viscosity gradient inside the substrate laterally and orthogonal to the flat surface within the locally limited region.

2. The method according to claim 1, wherein:
   the flat surface of the substrate is not contacted with a solid object during the application of heat and the flat surface of the substrate is contacted under the application of force to exclusively locally deform the flat surface within the locally limited region.

3. The method according to claim 2, comprising:
   applying heat exclusively within the locally limited region via the flat surface of the substrate which causes pre-heating of the substrate to a temperature below the softening temperature of the substrate.

4. The method according to claim 1, comprising:
   applying heat exclusively within the locally limited region via the flat surface of the substrate which causes pre-heating of the substrate to a temperature below the softening temperature of the substrate.

5. The method according to claim 1, comprising:
applying the force acting on the surface within the locally limited region with a tool which contacts the flat surface which is then separated from the surface.

6. The method according to claim 1, comprising:
applying the force acting on the surface within the locally limited region by one of a positive or negative pressure prevailing locally above the surface which acts continuously or in a pulsed manner at least on the surface within the locally limited region.

7. The method according to claim 1, comprising:
applying the force acting on the surface within the locally limited region to provide at least one of one a haptically and a visually perceptible structure formed on the locally limited surface of the substrate.

8. The method according to claim 1, comprising:
during application of heat, applying the force acting on the surface and cooling the substrate while the substrate rests on a heat-removing underlayer.

9. The method according to claim 1, comprising:
applying heat exclusively within a locally limited region via the surface of the substrate by one of laser radiation, a gas flame, infrared radiation, microwaves or plasma discharge directed towards the surface of the substrate so that the substrate is softened at least on the surface within the locally limited region;
applying a force acting on a substrate surface opposite the softened surface within the locally limited region so that the softened surface of the substrate is deformed within the region; and
cooling the substrate to obtain a surface that is deformed and is set within the local region.

10. The method according to claim 9, comprising:
applying the heat to establish a temperature gradient between the softened surface and the substrate surface opposite the locally limited region so that the substrate is plastically deformable in at least some regions.

11. The method according to claim 9, comprising:
applying the force acting on the substrate surface by a tool which at least one of contacts the substrate surface and applies a positive or negative pressure prevailing locally above the substrate surface.

12. The method according to claim 1, comprising:
selecting as a material for the substrate from soda lime glass, borosilicate glass, aluminosilicate glass, quartz glass, chalcogenide glass, and mixtures of such glasses with metals or ceramics.

13. A method for locally deforming a flat surface of a substrate made of glass or a glass ceramic, comprising:
applying heat exclusively within a locally limited region via the flat surface of the substrate by one of laser radiation, a gas flame, infrared radiation, microwaves or a plasma discharge directed towards the flat surface of the substrate to soften the substrate at least on the flat surface within the locally limited region;
applying a force acting on the softened flat surface within the locally limited region to deform the softened surface of the substrate within the locally limited region; and
applying heat exclusively within the locally limited region via the flat surface of the substrate until the substrate on the flat surface within the locally limited region acquires a viscosity between $10^5$-$10^{11}$ Pa·s.

14. The method according to claim 13, wherein the heat is applied until the viscosity is between $10^8$-$10^9$ Pa·s.

15. A method for locally deforming a flat surface of a substrate made of glass or a glass ceramic, comprising:
applying heat exclusively within a locally limited region via the flat surface of the substrate by one of laser radiation, a gas flame, infrared radiation, microwaves or a plasma discharge directed towards the flat surface of the substrate to soften the substrate at least on the flat surface within the locally limited region;
applying a force acting on the softened flat surface within the locally limited region to deform the softened surface of the substrate within the locally limited region;
cooling the substrate to obtain a set deformed surface within the locally limited region; and
applying the force acting on the surface within the locally limited region by adhesion of at least one body to the softened surface which undergoes at least one of a permanent non-positive connection to the substrate and a bonded connection to the substrate.

\* \* \* \* \*